H. G. BULKLEY.
Agricultural-Boilers.

No. 149,915.

Patented April 21, 1874.

WITNESSES

INVENTOR

UNITED STATES PATENT OFFICE.

HENRY G. BULKLEY, OF NEW YORK, N. Y.

IMPROVEMENT IN AGRICULTURAL BOILERS.

Specification forming part of Letters Patent No. 149,915, dated April 21, 1874; application filed February 25, 1874.

*To all whom it may concern:*

Be it known that I, HENRY G. BULKLEY, of the city, county, and State of New York, have invented a certain Improvement in a Portable Agricultural Boiler and Evaporator, of which the following is a specification:

The nature of my invention consists in arranging in the smallest space, and in the least expensive manner, a portable agricultural boiler and evaporator, having an extensive fire heating-surface to make it not only efficient but a means of saving fuel.

It is also especially arranged so that it may with equal facility be connected with an extension-surface for the rapid evaporation of liquids, or be so confined that all of the heat shall be applied to the heating of the largest amount of water with the least waste of fuel. It can also be made of a great variety of sizes, from that of a nurse-lamp to one capable of either steaming or boiling food for a hundred head of cattle or more. It can also be constructed of a great variety of metals, either heavy or light, consisting of cast-iron, common or galvanized sheet-iron, tin, copper, brass, or other metals, and of a more or less durable nature, and of more or less weight. It can also be made by any ordinary worker in tin and sheet-iron, and be constructed in any place, thus often saving a large per cent. in freight, as well as breakage in transportation.

It is intended to be made useful in every family for heating water in any wash-tub or washing-machine, also in a tub for scalding hogs, by which means the water may be kept continually hot, while the same heater may be at once attached to any evaporator, and of any capacity for the manufacture of maple or other sugar, and be used for heating milk in any cheese-factory, or for heating or evaporating any other liquid, and using therefor any hogshead, barrel, or other vessel the farmer may have on hand that will contain the liquid.

Figure 1:
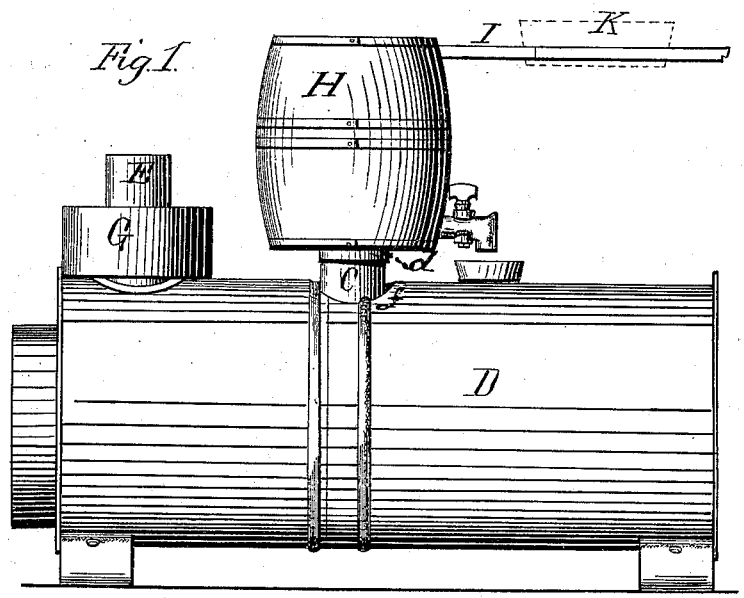
Figure 2:
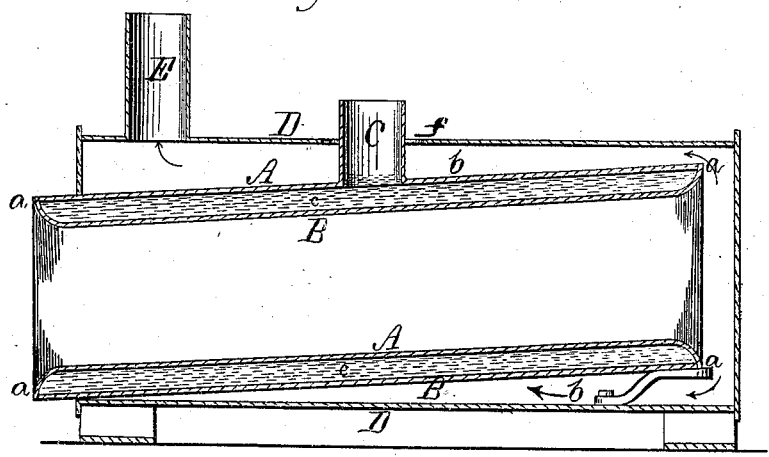

In constructing it for use, I form two cylinders of any desired length or diameter, one larger than the other, so that when one is placed inside of the other and the ends are connected together, as shown at *a a* in the accompanying drawing making a part of this specification, there will be any desired space between the cylinders *c c*, for water to entirely surround the fire when the fire is built inside of the smaller tube. The space between the ends of the cylinders may be closed water-tight by enlarging the ends of the smaller tube until they will just fill the ends of the larger tube, and then rivet or solder them together, or cast rings with flanges may be used for the ends of both tubes, and then bolt them against gaskets to make them water-tight. A mouth-piece, C, must be connected with the outer cylinder A to conduct the water from any cask or other receptacle, in order to supply the water automatically to the boiler or space *c* between the two cylinders. The tube C is provided on its upper end with a gasket, *d*, of india-rubber or other suitable material, to fit tightly into a corresponding opening in any barrel, tub, pan or other vessel for automatically supplying water to the boiler. This tube C also serves to conduct the steam generated in the boiler through the same passage C, to the receptacle of water. As long, therefore, as there is water in the cask H, and a fire in the arch, the heating of water or its evaporation continues. To increase still further the fire heating-surface, an inclosing-case, D, around the boiler, except the fire-door, is made of any sheet metal to make a return-flue, *b b*, for the smoke and heat before reaching the chimney-pipe E, thus doubling the fire heating-surface, in order to add efficiency to the boiler, and prevent the waste of heat. By this means the water, in the first place, entirely surrounds the fire, and, by means of the return-flue, the fire is made to entirely surround the water. The said inclosing-case D is formed in two parts, lapping or joining together at the proper place, for a slot or aperture, *f*, in the case, to allow the extension upward of the tube C of the boiler, as represented. Thus, the case can be readily removed and replaced without interfering with the said tube. In the case of the evaporation of the liquids, some further economy may be produced in the saving of heat, by having a reservoir, G, Figure 1, surrounding the smoke-pipe, to use the last of the heat to warm the water preparatory to its entering the evaporator H. When it is desirable to keep the air from the liquid while being evaporated, in order to preserve its aroma or the color of the liquid, as in the evaporation of maple or other sugar, the liquid may be evaporated in a tight cask, H, and by means of the pipe I the escape steam may be passed through a coil of pipe lying in the bottom of the pan K, for the purpose of using the latent heat of the steam from the evaporating-cask H, and at the same time complete the concentration of the sirup under a lower degree of heat; or this escape steam may be used to steam and soften the sugar-cane when cut fine, so that the juice may be pressed out with screws, in place of expressing the juice in the ordinary way between expensive rollers. Practical tests which I have made show that when the cane is cut fine, and then steamed or boiled, it may be pressed with screws and obtain more of the sacharine and less of the gum and green matter, while the juice is strained of its impurities, and the bagasse may be thus pressed sufficiently dry to be used for fuel in the evaporation.

I claim—

1. The combination of the inner and outer boiler, cylinders A B, pipe or tube C, gasket $d$, and inclosing-case D, substantially as and for the purpose herein specified.

2. The combination of the case D, having the slot or opening $f$, and divided in two parts at the said slot or opening, with the boiler-cylinder A and its pipe or tube C, substantially as and for the purpose herein specified.

HENRY G. BULKLEY.

Witnesses:
 THOMAS C. CONNOLLY,
 A. E. BEECHER.